United States Patent
Schmidtke et al.

(10) Patent No.: US 7,307,924 B2
(45) Date of Patent: Dec. 11, 2007

(54) SYSTEMS AND METHODS FOR CARTRIDGE IDENTIFICATION

(75) Inventors: Gregg S. Schmidtke, Fort Collins, CO (US); Kelly John Reasoner, Fort Collins, CO (US); Douglas Alan Dale, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 407 days.

(21) Appl. No.: 10/974,130

(22) Filed: Oct. 27, 2004

(65) Prior Publication Data

US 2006/0090176 A1  Apr. 27, 2006

(51) Int. Cl.
G11B 15/68 (2006.01)
G11B 33/02 (2006.01)

(52) U.S. Cl. ............... 369/30.3; 369/30.35; 369/30.4; 720/645

(58) Field of Classification Search ........ 720/631–634, 720/645; 369/34, 30.3–30.99; 360/98.01, 360/98.05, 99.06, 97.01
See application file for complete search history.

(56) References Cited

U.S. PATENT DOCUMENTS

| | | | |
|---|---|---|---|
| 6,160,786 A | 12/2000 | Coffin et al. | |
| 6,198,593 B1 * | 3/2001 | Hori et al. | 360/92 |
| 6,219,313 B1 * | 4/2001 | Ries et al. | 369/30.31 |
| 6,231,291 B1 | 5/2001 | Mueller et al. | |
| 6,298,017 B1 * | 10/2001 | Kulakowski et al. | 369/36.01 |
| 6,396,656 B1 * | 5/2002 | Satou | 360/92 |
| 6,445,652 B1 | 9/2002 | Foslien et al. | |
| 6,449,223 B1 * | 9/2002 | Kanetsuku et al. | 369/30.41 |
| 6,570,841 B1 * | 5/2003 | Nakashima | 720/731 |
| 6,663,003 B2 | 12/2003 | Johnson et al. | |
| 6,693,858 B2 | 2/2004 | Reasoner et al. | |
| 6,775,093 B1 | 8/2004 | Schmidtke et al. | |
| 2001/0022765 A1 * | 9/2001 | Sanada et al. | 369/75.2 |
| 2003/0173438 A1 * | 9/2003 | Stamm et al. | 242/348 |
| 2003/0193884 A1 * | 10/2003 | Louie | 369/291 |
| 2004/0012878 A1 * | 1/2004 | Yamakawa et al. | 360/92 |
| 2005/0231847 A1 * | 10/2005 | Rathweg et al. | 360/96.5 |

FOREIGN PATENT DOCUMENTS

JP  11185330 A  *  7/1999

* cited by examiner

*Primary Examiner*—Brian E. Miller
*Assistant Examiner*—Matthew G. Kayrish

(57) ABSTRACT

In one embodiment, a cartridge identification system includes a cartridge type detection station in which a cartridge can be inserted, and apparatus that determines the extent to which the cartridge protrudes from the detection station, the extent of protrusion being indicative of the cartridge type.

28 Claims, 9 Drawing Sheets

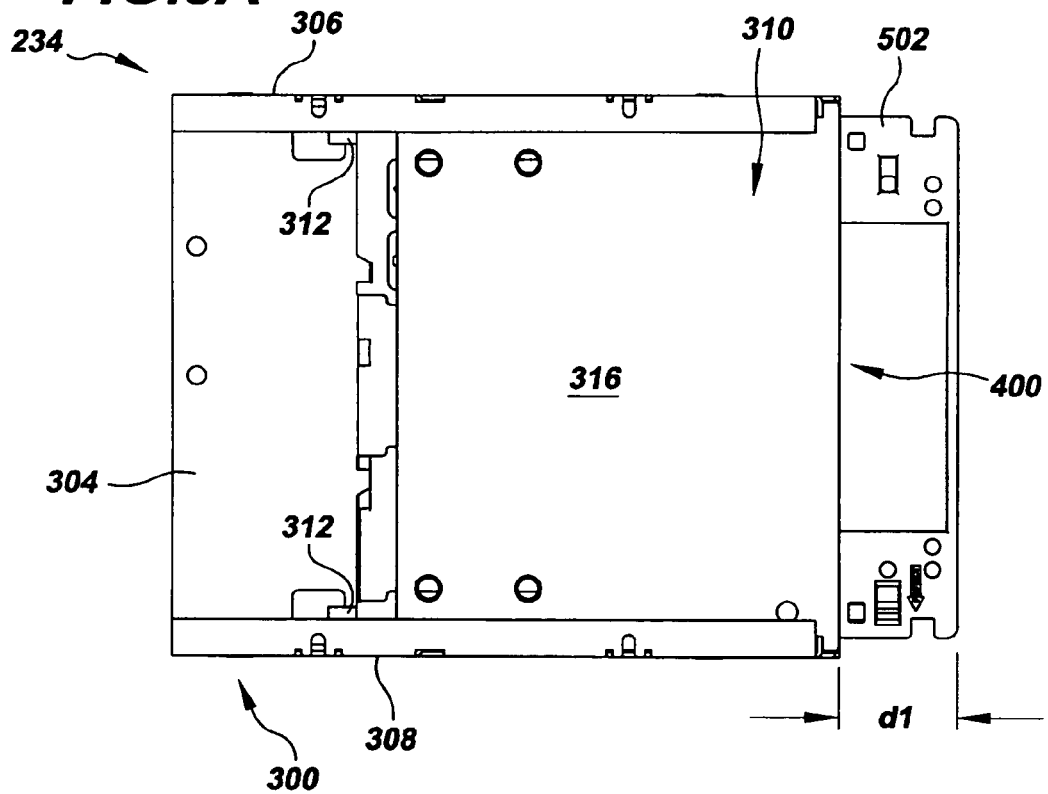
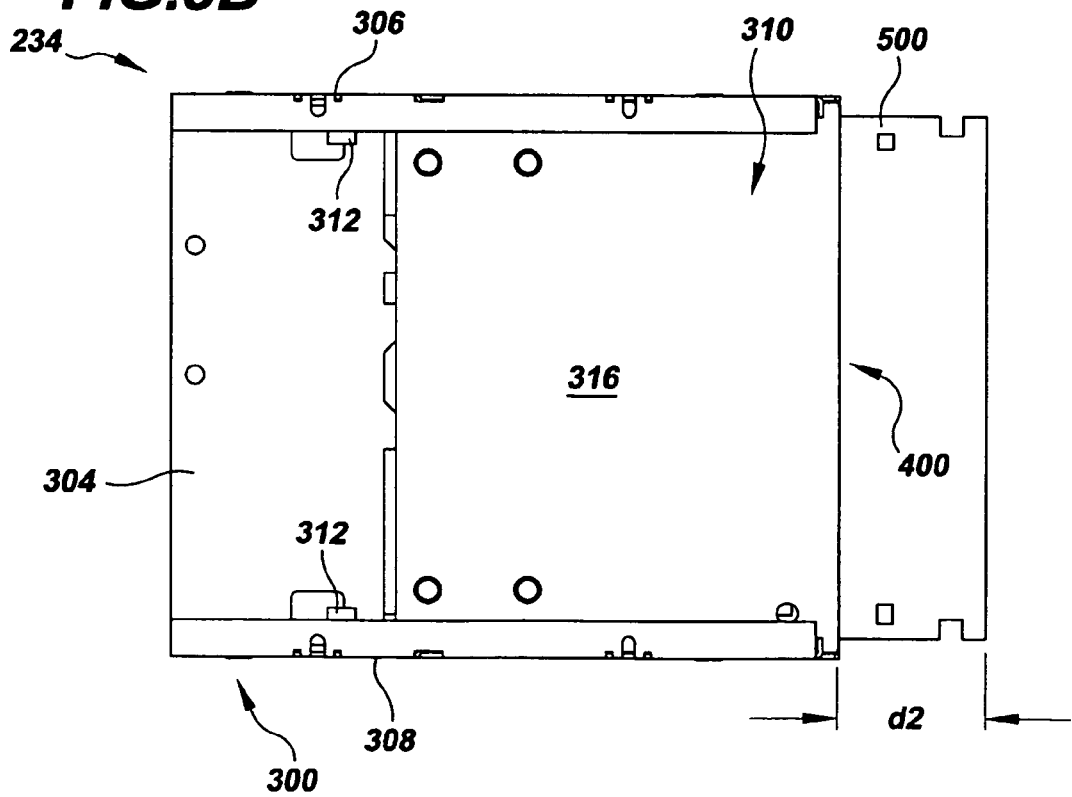

SYSTEMS AND METHODS FOR CARTRIDGE IDENTIFICATION

BACKGROUND

Archival libraries typically comprise media cartridges that are used to store data. Such libraries often include a mechanism that is used to select cartridges housed in the library, and insert them into a media drive of the library for writing or reading of data. In such cases, once the writing or reading has been completed, the mechanism removes the media cartridge from the drive, and places it back in a storage location of the library for later use. One example of such an archival library is an optical library that includes cartridges that each contain a high-density optical disc. Many such optical libraries comprise so-called magneto-optical (MO) cartridges that contain optical discs that are written to using a magnetic field.

Magneto-optical libraries have been used for several years. Over that time period, MO cartridges having been developed that have greater and greater storage density. It appears now, however, that the limits of the MO technology have nearly been reached. Due to the perceived storage density limitations of the MO technology, a new form of storage media, referred to as ultra density optical (UDO), has been developed. With UDO technology, an optical disc whose state can be changed using laser beam pulses is provided in each media cartridge (i.e., UDO cartridge). Because of the greater storage density of UDO discs, UDO cartridges are available that, although roughly the same size as MO cartridges, have several times the storage capacity of the highest capacity MO cartridges.

It is unlikely that UDO cartridges will immediately replace MO cartridges, at least in part because many users still possess MO-based libraries and/or MO cartridges. In appreciation of this fact, several library manufacturers are now developing libraries that use both MO and UDO cartridges.

Because the MO and UDO technologies use different methods to write and read data, MO and UDO technologies are not compatible. Therefore, MO and UDO drives must be provided in libraries that accept both MO and UDO cartridges. Due to the incompatibility of MO and UDO cartridges, it is necessary for the library to identify the cartridge type for each cartridge within the library. Without such identification, mis-insertion of cartridges could occur, resulting in errors that may require a time-consuming recovery process and, potentially, human intervention.

SUMMARY

Disclosed are systems and method for cartridge identification. In one embodiment, a cartridge identification system includes a cartridge type detection station in which a cartridge can be inserted, and apparatus that determines the extent to which the cartridge protrudes from the detection station, the extent of protrusion being indicative of the cartridge type.

BRIEF DESCRIPTION OF THE DRAWINGS

The disclosed systems and methods can be better understood with reference to the following drawings. The components in the drawings are not necessarily to scale.

FIG. 8A is a top view of the detection station and the ultra density optical cartridge of FIG. 6.

FIG. 8B is a top view of the detection station and the magneto-optical cartridge of FIG. 7.

DETAILED DESCRIPTION

Disclosed are systems and methods for identifying the cartridge type of cartridges housed within an archival library. As is described in the following, the archival library includes a cartridge type detection station into which cartridges of different types can be inserted. The extent to which the cartridges can be inserted into the detection station and, therefore, the extent to which the cartridges protrude from the detection station when fully inserted therein, provides an indication of the cartridge type. In some embodiments, the protrusion extent can be determined using an encoder of a picker mechanism that is used to transport cartridges within the library.

Figure 1:
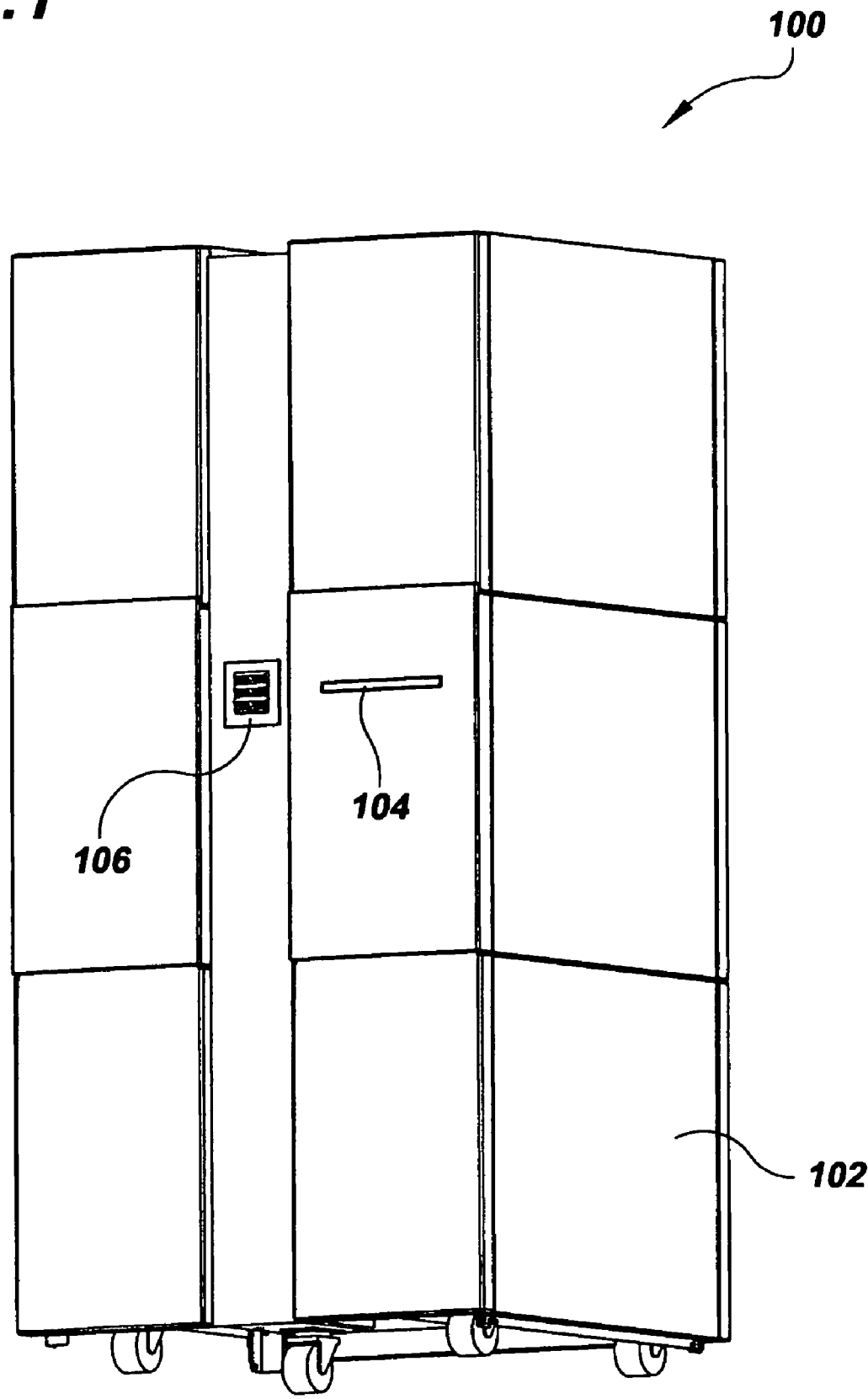
FIG. 1 is a front perspective view of an embodiment of an archival library that uses media cartridges of at least two different types.

Referring now in more detail to the drawings, in which like numerals indicate corresponding parts throughout the several views, FIG. 1 illustrates an embodiment of an archival library 100 that uses media cartridges of different types. By way of example, the library 100 is an optical library that comprises both magneto-optical (MO) and ultra density optical (UDO) cartridges, as well as MO and UDO drives. As is indicated in FIG. 1, the library 100 includes an outer housing 102 in which is provided a deposit or "mail" slot 104 and a control panel 106. Media cartridges (e.g., optical cartridges) can be inserted through the deposit slot 104 and into an internal deposit bin (not visible in FIG. 1) to enable the transport mechanism of the library 100 to access the cartridge to, for example, store data on the cartridge. In some embodiments, the deposit slot 104 is dimensioned so as to be able to receive MO and UDO cartridges.

Figure 2:
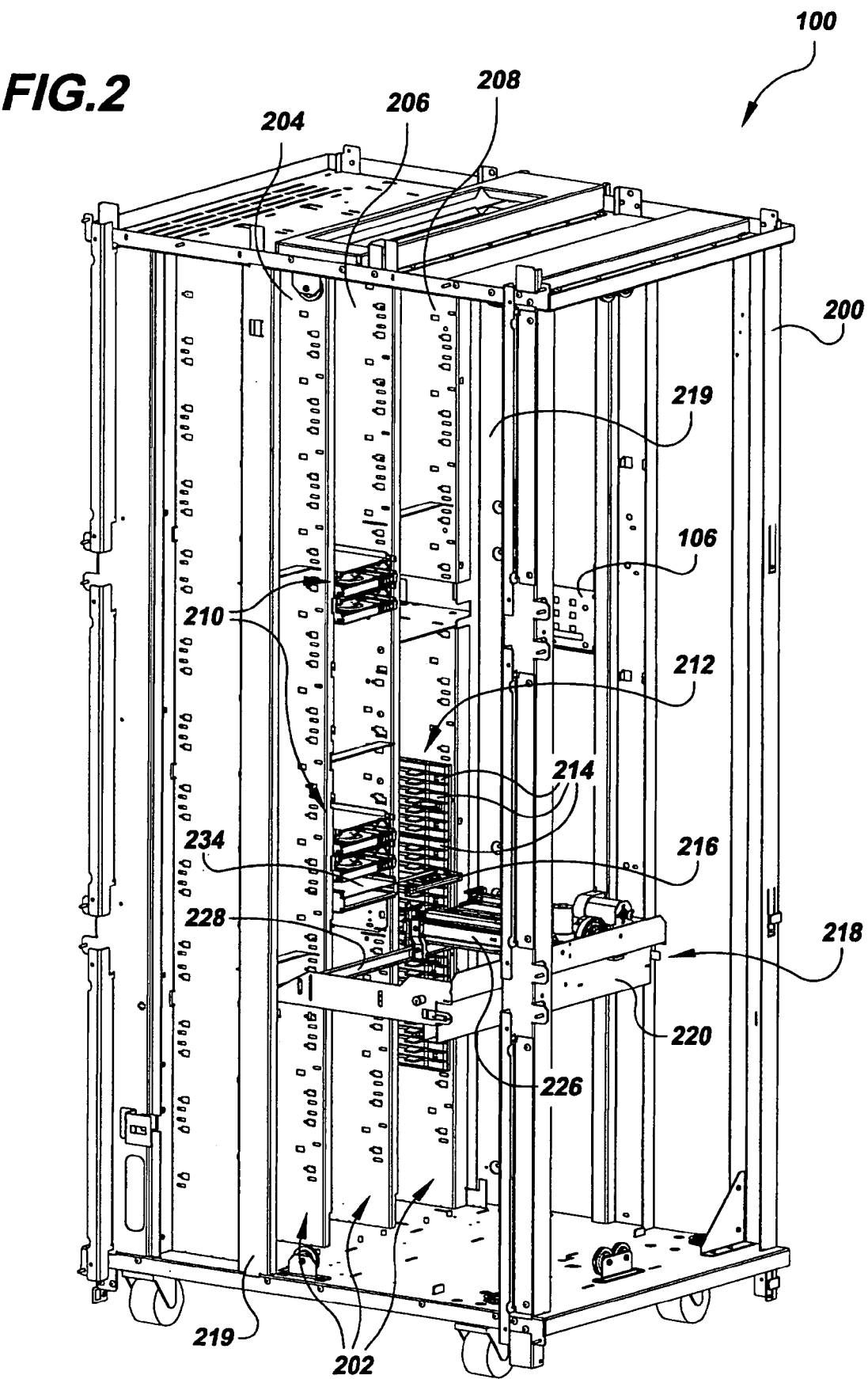
FIG. 2 is a rear perspective view of the library of FIG. 1, shown with a housing of the library removed so that internal components of the library are visible.

FIG. 2 illustrates the library 100 of FIG. 1 from the rear, with the outer housing 102 removed so as to reveal internal components of the library. It is noted that components beyond those which are shown in FIG. 2 and described herein can be contained within the library 100, but are not discussed herein given that they are beyond the scope of this disclosure.

As is indicated in FIG. 2, the library 100 includes an inner chassis or frame 200 that provides a structure to which the outer housing (102, FIG. 1) mounts. Connected to the inner chassis 200 are several mounting panels 202 to which various internal components of the library 100 mount. By way of example, these mounting panels 202 are configured as vertical panels that extend from the top of the library 100 to the bottom of the library. In the embodiment of FIG. 2, mounted between first and second mounting panels 204 and 206 are multiple media drives 210. In keeping with the example provided above, these drives 210 include both MO drives and UDO drives that are configured for writing to and reading from MO cartridges and UDO cartridges, respectively. Although four such media drives 210 are shown in FIG. 2, fewer or greater drives could be provided in the library 100 if desired.

Mounted between second and third mounting panels 206 and 208 are magazines 212 that comprise a plurality of storage slots 214 that are adapted to receive and house media cartridges. By way of example, each storage slot 214 is configured to receive and house one or both of MO cartridges and UDO cartridges. In the example of FIG. 2, one such cartridge 216 is shown housed in one of the storage slots 214.

Further illustrated in FIG. 2 is a picker mechanism 218 that is used to transport cartridges within the library 100. For example, the picker mechanism 218 can be used to remove (or "pick") cartridges from a deposit bin (not visible in FIG. 2) to which the deposit slot (104, FIG. 1) provides access, deposit cartridges in the storage slots 214, place cartridges in appropriate drives, remove cartridges from their drives, and so forth. The picker mechanism 218 includes a picker frame 220 that is configured to move along vertical rails 219 provided within the library 100. In the example of FIG. 2, the picker mechanism 218 travels along the vertical rails 219 through use of a pulley system (not shown) that is driven by a vertical lift motor (not shown) that is also provided within the library 100.

The picker mechanism 218 further includes a picker carriage 226 that is configured to travel horizontally within the picker frame 220 so as to enable the picker carriage to be positioned between the first and second mounting panels 204 and 206 to access the media drives 210, and between the second and third mounting panels 206 and 208 to access the magazines 212 and the cartridges that are housed in its storage slots 214. By way of example, the picker carriage 226 travels along horizontal rails 228 (only one horizontal rail visible in FIG. 2) under the driving force of a lateral translation motor (see FIG. 9) that is provided on the picker carriage. In addition, the picker carriage 226 includes a plunge axis motor (see FIG. 9) that, as is described in greater detail below, is used to insert media cartridges into and remove media cartridges from the media drives 210 and the storage slots 214.

Further shown in FIG. 2 is a cartridge type detection station 234. In the embodiment of FIG. 2, the detection station 234 is mounted between the first and second mounting panels 204 and 206. In alternative embodiments, however, the detection station 234 can be positioned between the second and third mounting panels 206 and 208, or anywhere else within the library 100 that the picker mechanism 218 can access.

Figure 3:
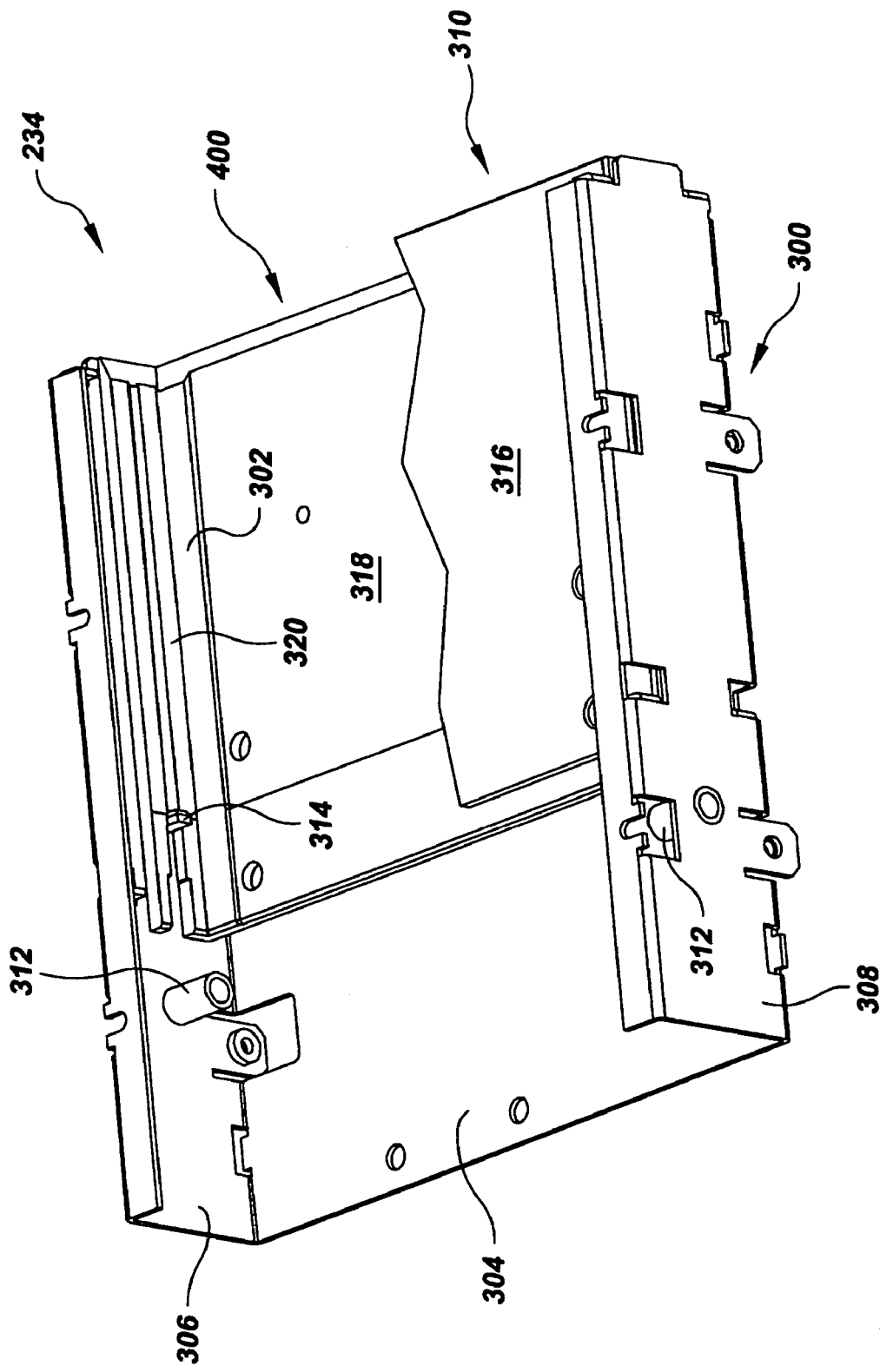
FIG. 3 is a partial cut-away, perspective view of an embodiment of a cartridge type detection station that is provided within the library of FIGS. 1 and 2.
Figure 4:
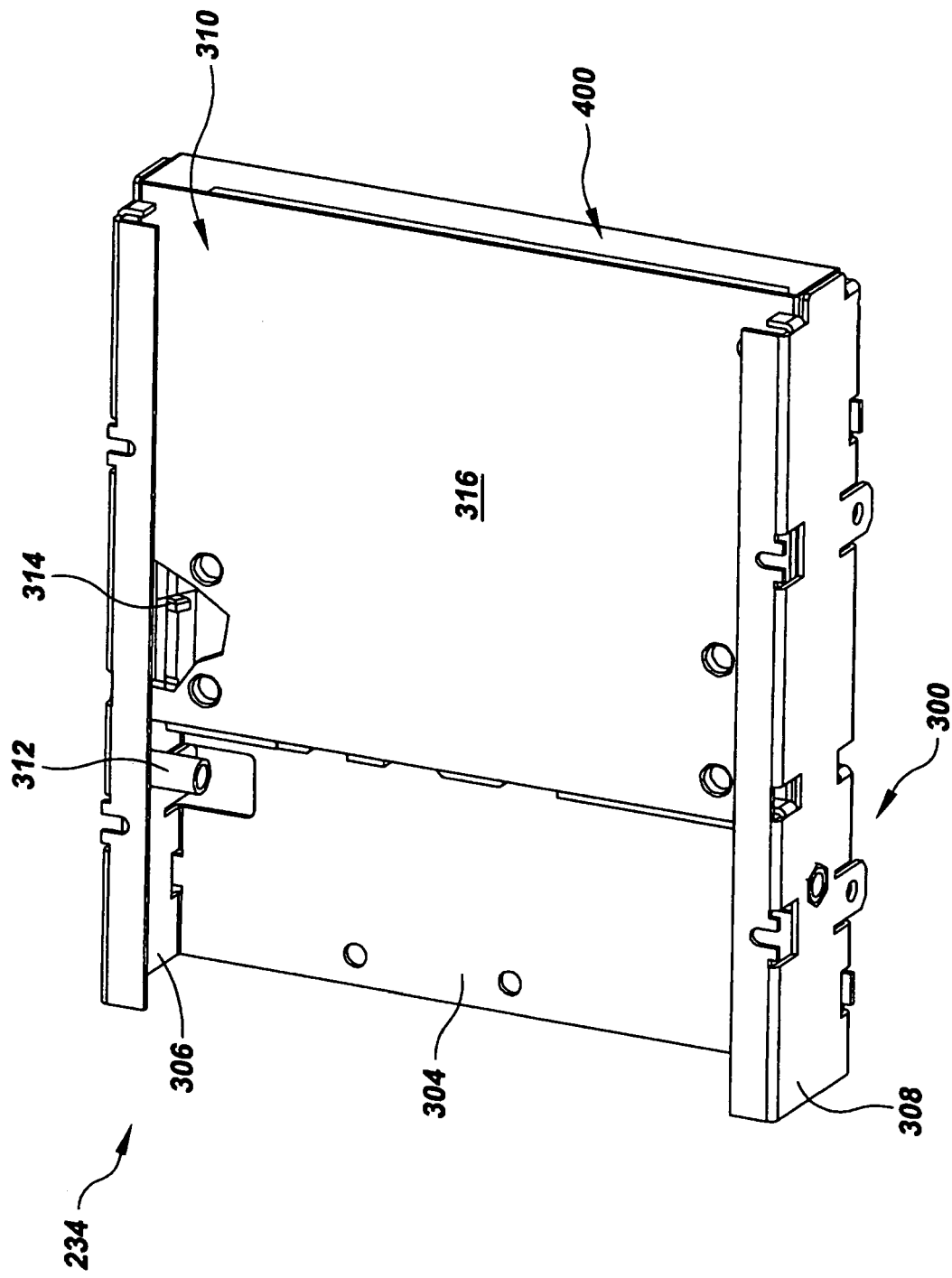
FIG. 4 is a partial-cut away, second perspective view of the cartridge type detection station of FIG. 3.

FIGS. 3 and 4 illustrate the cartridge type detection station 234 independent of the remainder of the library 100. As is indicated in those figures, the detection station 234 includes a generally box-shaped outer housing 300 that defines a base 304 and side walls 306, 308 of the station. By way of example, the outer housing 300 is constructed from a single piece of metal material, for instance from a piece of stamped steel sheet metal. Although stamped sheet metal is preferred in some embodiments for its ease of manufacturing and low cost, alternative constructions may be used, if desired.

The detection station 234 further includes a cartridge-receiving portion 310 that, in the illustrated embodiment, comprises a plastic sleeve that is mounted to and partially enclosed by the outer housing 300. In cases in which, as in FIGS. 3 and 4, the outer housing 300 includes no top cover (i.e., the top of the housing is open), the cartridge-receiving member 310 defines a top surface of the detection station 234. With specific reference to FIG. 4, the cartridge-receiving member 310 defines an opening 400 at the front of the detection station 234 through which cartridges, such as MO and UDO cartridges, can be inserted into the detection station.

The cartridge-receiving member 310 is configured such that media cartridges that are received through the opening 400 can be inserted deep into the detection station 234 in similar manner to that in which media cartridges are inserted into a media drive or storage slot. Accordingly, cartridges slide along an interior path defined by the cartridge-receiving member 310 during insertion into the detection station 234. As is indicated in FIGS. 3 and 4 (revealed through the cut-away of a top portion of the cartridge-receiving member), the cartridge-receiving member 310 includes rails 302 that support and guide the cartridges along the interior path (only one rail visible in FIG. 3). By way of example, such rails 302 are provided on the top and bottom of the interior path defined by the cartridge-receiving member 310. In the illustrated embodiment, the cartridge-receiving member 310 comprises integral top and bottom portions 316 and 318 and opposed side portions 320 that together define top, bottom, and side walls of the cartridge-receiving member 310 that define interior path.

Figure 5:
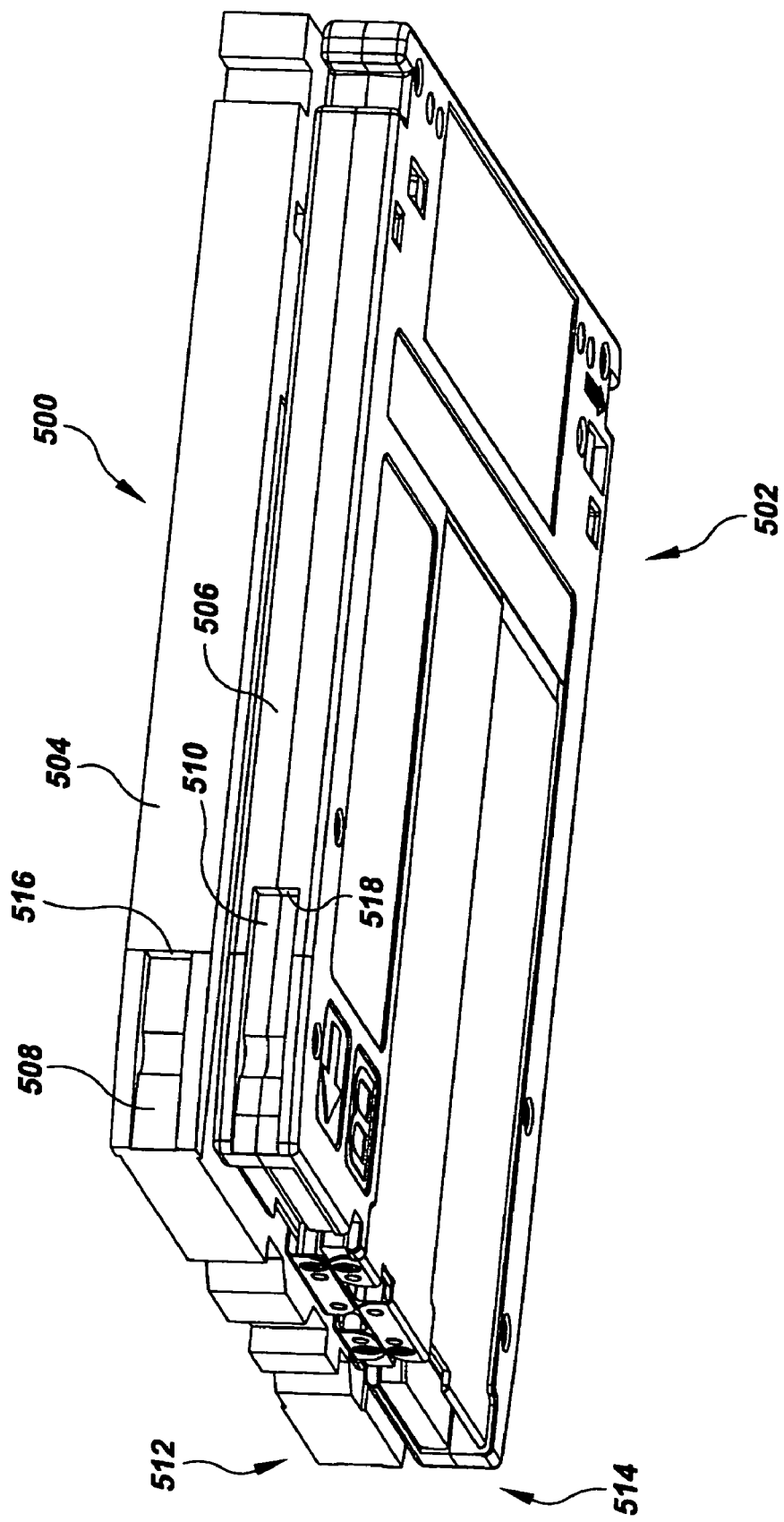
FIG. 5 is a perspective view of a magneto-optical cartridge positioned beside an ultra density optical cartridge.

The extent to which cartridges can be inserted within the detection station 234 depends upon the particular configuration of the cartridge that is being inserted. Two example cartridges 500 and 502 are illustrated in FIG. 5 for purposes of discussion. In this example, the top cartridge 500 is a MO cartridge and the bottom cartridge 502 is a UDO cartridge. As is apparent from FIG. 5, the MO cartridge 500 and the UDO cartridge 502 are similar in size, shape, and configuration. For example, both cartridges 500, 502 are generally box-shaped and have a thickness (vertical in FIG. 5) dimension that is substantially less than their length and width dimensions. Moreover, each cartridge 500, 502 includes lateral sides 504 and 506, respectively, that include grooves or slots 508 and 510 that are located at an insertion or front end 512 and 514 of the cartridge. The slots 508, 510 are used to secure the cartridges 500, 502 when they are inserted into a drive or a storage slot.

Although each cartridge 500, 502 includes slots 508, 510, the lengths of these slots are different. Specifically, the length of the MO cartridge slot 508 is significantly shorter than the UDO cartridge slot 510. Specifically the MO cartridge has an end surface 516 that is significantly closer to the front end 512 than an end surface 518 of the UDO cartridge is to the front end 514. This difference ensures that MO cartridges, such as cartridge 500, cannot be fully inserted into a UDO drive. As is discussed below, the difference further facilitates identification of the cartridge type when the cartridge is inserted into the cartridge type detection station 234.

Returning back to FIGS. 3 and 4, the detection station 234 further includes stops 312 (i.e., UDO stops) that are adapted to limit insertion of UDO cartridges within the detection station. In the embodiment of FIGS. 3 and 4, one such stop 312 is mounted to each side wall 306, 308 at the same distance from the opening 400 of the cartridge-receiving member 310. By way of example, the stops 312 are configured as cylindrical members that are press fit to the side walls. In addition to the UDO stops 312, the detection station 234 also includes one or more further stops 314 (i.e., MO stops) that are adapted to limit insertion of MO cartridges within the detection station 234. In the embodiment of FIGS. 3 and 4, one MO stop 314 is formed as part of the cartridge-receiving member 310 and is positioned a distance from the opening 400 of the cartridge-receiving member that is less than the distance between the UDO stops 312 and the opening. The MO stop 314 is, in the illustrated embodiment, configured as a pin that is small enough to travel within the slots 508 of an MO cartridge 500 (FIG. 5).

Figure 6:
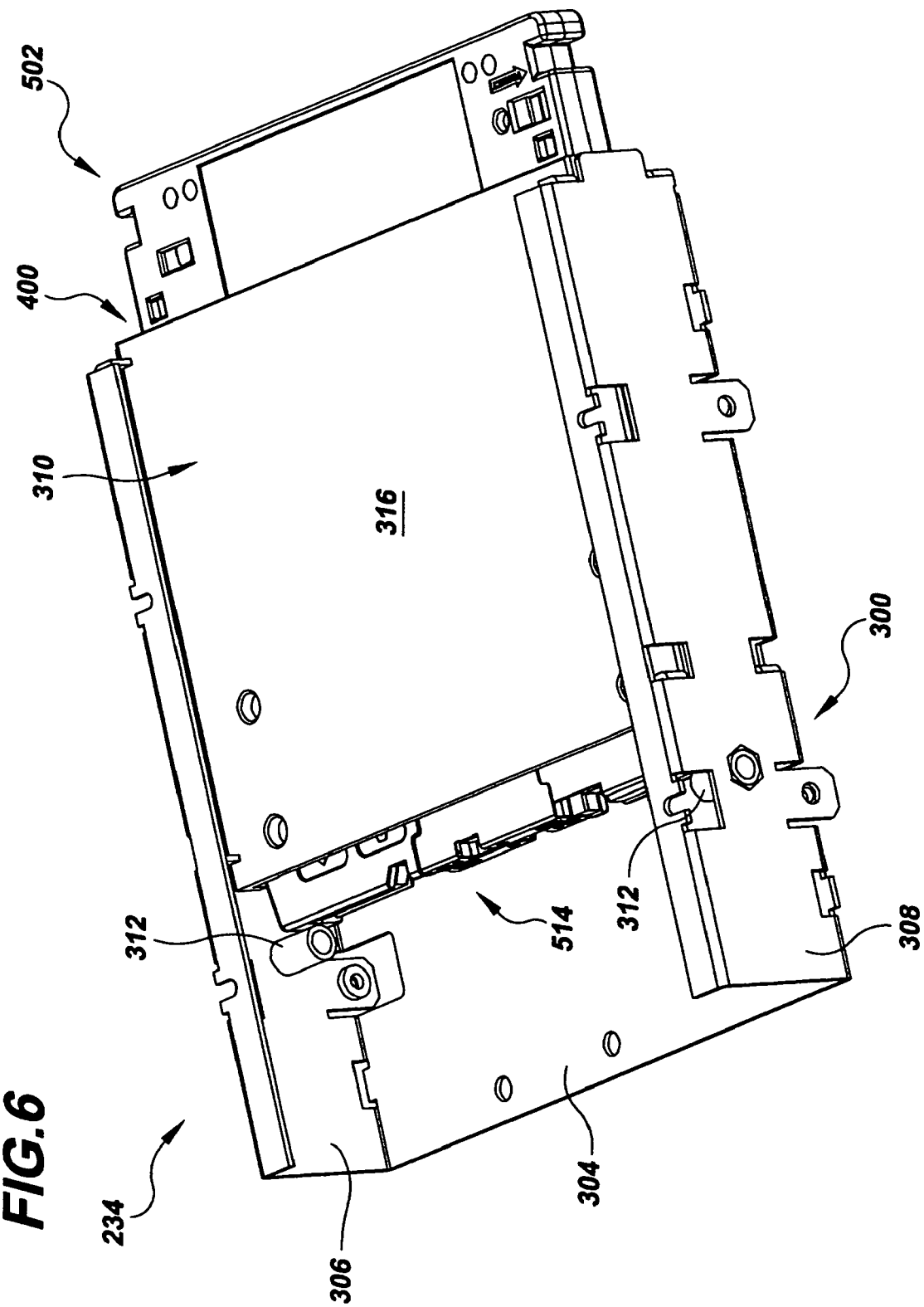
FIG. 6 is a perspective view of the detection station of FIGS. 3 and 4, shown with an ultra density optical cartridge inserted therein.

The above-described stops 312, 314 are used to limit insertion of media cartridges for purposes of identifying the type of the cartridges. This process will now be described with reference to FIGS. 6-9. Beginning with FIG. 6, the UDO cartridge 502 depicted in FIG. 5 is shown fully inserted into the detection station 234. By way of example, such insertion can have been achieved using the picker mechanism 218 which, as is described above in relation to FIG. 2, is configured to transport cartridges within the library 100. As is indicated in FIG. 6, the UDO cartridge 502 is received within the detection station 234 such that it contacts or abuts the UDO stops 312. Although the UDO cartridge 502 is inserted deep within the detection station 234 when contact is made between the front end 514 of the cartridge and the stops 312, the cartridge still protrudes or projects from the front of the detection station 234. The extent of this protrusion is identified in FIG. 8A as distance d1.

Figure 7:
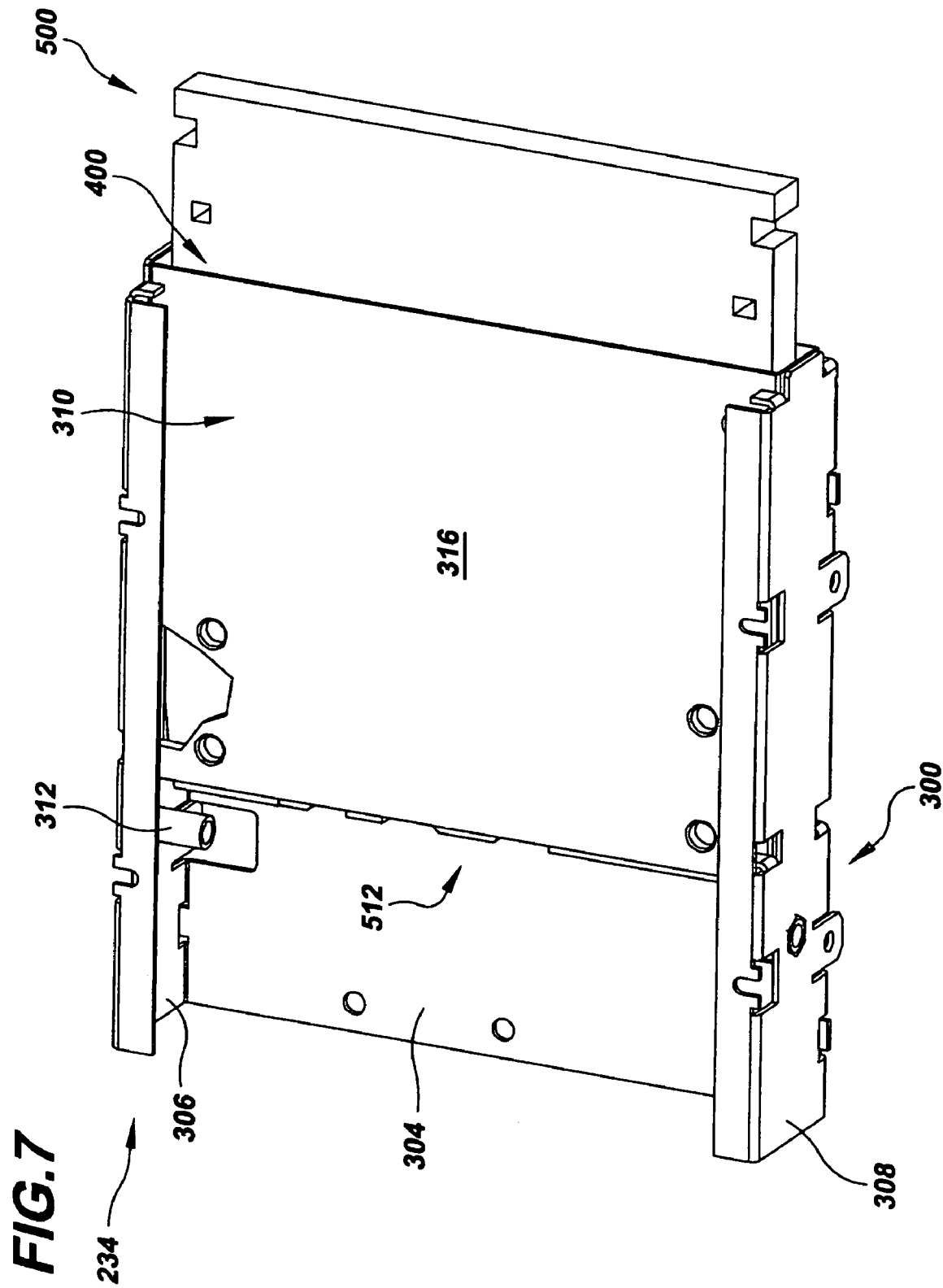
FIG. 7 is a perspective view of the detection station of FIGS. 3 and 4, shown with a magneto-optical cartridge inserted therein.

Referring now to FIG. 7, the MO cartridge 500 depicted in FIG. 5 is shown fully inserted into the detection station 234. Again, such insertion can be achieved using the picker mechanism 218 described above in relation to FIG. 2. As is indicated in FIG. 7, the MO cartridge 500 is received within the detection station 234 but does not reach the UDO stops 312. Instead, insertion of the MO cartridge 500 is halted by the MO stop 314 (FIGS. 3 and 4). Specifically, the MO stop 314 is received by one of the slots 508 of the MO cartridge 500, travels along the slot, and abuts the end surface 516 of the slot to limit insertion of the cartridge. Notably, the MO stop 314 does not limit the travel of UDO cartridges because the slots of such cartridges are significantly longer than those of MO cartridges (see discussion of FIG. 5). As with the UDO cartridge 502, the MO cartridge 500 protrudes or projects from the front of the detection station 234 when fully inserted. The extent of this protrusion is identified in FIG. 8B as distance d2.

As clear when FIGS. 8A and 8B are compared with each other, the distance d2 is greater than the distance d1, thereby indicating that the extent to which the MO cartridge 500 protrudes from the detection station 234 when the MO cartridge is fully inserted is greater than the extent to which the UDO cartridge 502 protrudes from the detection station when the UDO cartridge is fully inserted. The actual dimensions of d1 and d2 depend upon the particular placement of the stops 312, 314 from the front of the detection station 234. In some embodiments, d1 can be about 30 millimeters (mm) and d2 can be about 37 mm.

The extent to which a cartridge protrudes or projects from the detection station 234 (i.e., d1 and d2) can be used to determine the type of the cartridge. Specifically, an appropriate sensor or detector can be used to measure the extent of cartridge projection, and that extent can be correlated to a given cartridge type. For instance, in keeping with the example provided above, if the extent of protrusion of the cartridge is 30 mm, it can be determined that the cartridge is a UDO cartridge, while if the extent of protrusion is 37 mm, it can be determined that the cartridge is an MO cartridge.

Figure 9:
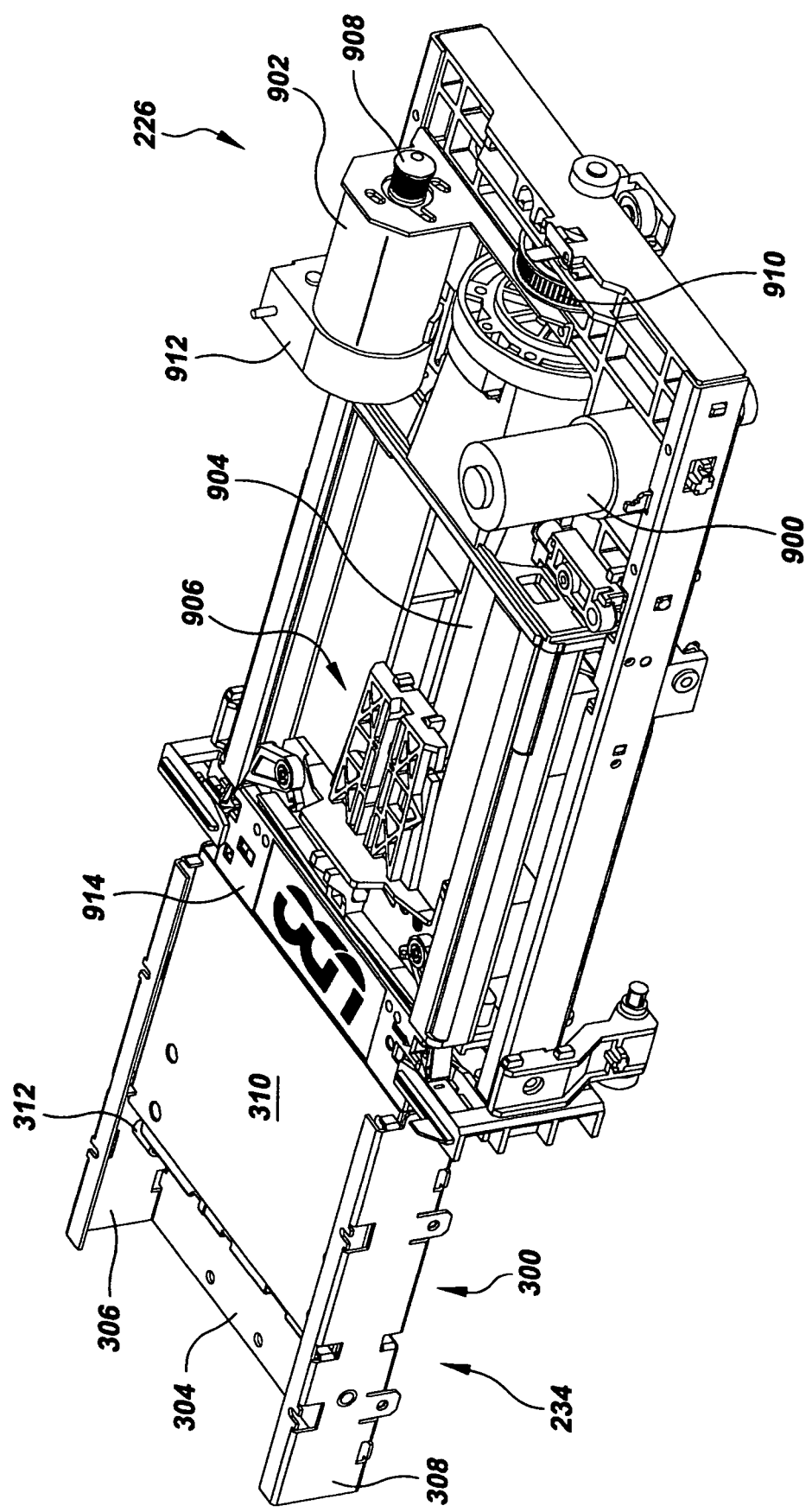
FIG. 9 is a perspective view illustrating an embodiment of determining a cartridge type from an extent that the cartridge protrudes from the detection station of FIGS. 3 and 4.

Referring now to FIG. 9, illustrated is an example process for determining the extent of protrusion of a media cartridge that is fully inserted within the detection station 234. In this example, the extent of cartridge protrusion can be determined using the picker mechanism 218 and, more particularly, the carriage 226 of the picker mechanism. As is apparent from FIG. 9, the picker carriage 226 includes a lateral translation motor 900 and a plunge axis motor 902. The lateral translation motor 900 is used to drive the picker mechanism carriage 226 horizontally within the picker mechanism 218 in the manner described above in relation to FIG. 2.

The plunge axis motor 902 is used to insert cartridges into and remove cartridges from drives 210, storage slots 214, and the detection station 234 (FIG. 2). More particularly, the plunge axis motor 902 drives a picker 906 that grips media cartridges and moves them toward and away from the plunge axis motor. In the embodiment of FIG. 9, the plunge axis motor 902 includes a drive pulley 908 that drives a belt (not shown) that, in turn, drives a pulley 910 that, in turn, drives a lead screw 904. When the pulley 910 is so driven, the lead screw 904 linearly displaces the picker 906 along the carriage 226.

As is further illustrated in FIG. 9, the plunge axis motor 902 is connected to a plunge axis encoder 912. The encoder 912 includes an internal wheel (not visible in FIG. 9) that has a plurality of notches along its periphery. As the picker 906 is driven along the carriage 226 by the plunge axis motor 902, the internal wheel of the encoder 912 rotates relative to an internal optical sensor (not visible in FIG. 9) that detects the notches. Through that detection, the notches passing before the sensor can be counted as the motor is driven (in either direction), so that angular position of the wheel and, therefore, the linear position of the picker 906, can be determined.

When, as shown in FIG. 9, the picker 906 is fully extended so as to fully insert a media cartridge 914 (e.g., a UDO cartridge) into the detection station 234, the linear position of the picker can be determined using the encoder 912 in the manner described above. Once the picker position is determined, that position can be used to identify the cartridge type using correlation information (e.g., stored by a controller of the library) that associates the plunge mechanism position with cartridge type. Therefore, the cartridge type can be determined from the plunge mechanism position, which is dictated by the extent to which the cartridge 914 extends from the detection station 234. Accordingly, the cartridge type can be determined from the extent to which the cartridge 914 extends from the detection station 234.

After the type of the cartridge has been determined, the library 100 stores information as to that type such that the library will from this point on "know" of what type the cartridge is. Therefore, errors from cartridge mis-inseration can be avoided.

What is claimed is:

1. A cartridge identification system for an archival library, the system comprising:
   a dedicated cartridge type detection station having an opening in which media cartridges can be inserted for the purpose of determining cartridge type, the detection station being separate from storage slots of the library in which the cartridges are stored when not in use; and
   apparatus that determines a distance that a cartridge protrudes from the detection station when the cartridge is fully inserted into the detection station, the determined distance indicating the cartridge type.

2. The system of claim 1, wherein the dedicated cartridge type detection station defines an insertion path along which the cartridges travel when inserted into the detection station.

3. The system of claim 2, wherein the insertion path is defined by rails that guide the cartridge along the insertion path.

4. The system of claim 1, wherein the dedicated cartridge type detection station includes a first stop that is configured to limit insertion of cartridges into the detection station.

5. The system of claim 4, wherein the first stop is adapted to contact an insertion end of cartridges to limit insertion of the cartridges.

6. The system of claim 4, wherein the dedicated cartridge type detection station further includes a second stop that is configured to limit insertion of cartridges into the detection station, the first stop being spaced a first distance from an opening of the detection station through which cartridges are inserted and the second stop being spaced a second distance from the opening, wherein the first distance is different from the second distance.

7. The system of claim 6, wherein the first distance is greater than the second distance.

8. The system of claim 6, wherein the second stop is adapted to travel along a slot provided in cartridges that are inserted into the dedicated cartridge type detection station.

9. The system of claim 8, wherein the second stop is further adapted to contact an end surface of the slot to limit insertion of the cartridges.

10. The system of claim 6, wherein the first stop is an ultra density optical (UDO) stop that is adapted to limit insertion of UDO cartridges, and the second stop is a magneto-optical (MO) stop that is adapted to limit insertion of MO cartridges.

11. The system of claim 10, wherein the MO stop causes MO cartridges that are fully inserted into the dedicated cartridge type detection station to protrude farther from the detection station than the UDO stop causes UDO cartridges that are fully inserted into the detection station to protrude.

12. The system of claim 1, wherein the apparatus that determines the distance comprises an encoder of a picker mechanism.

13. The system of claim 12, wherein the apparatus that determines the distance further comprises a picker of the picker mechanism, wherein the encoder determines the linear position of the picker when the picker contacts a cartridge that is inserted into the dedicated cartridge type detection station.

14. A cartridge type detection station, comprising:
a housing;
a cartridge-receiving member that defines an insertion path along which media cartridges can travel, the cartridge-receiving member including an opening through which cartridges can be inserted to reach the insertion path; and
a first stop provided along the insertion path that is adapted to limit insertion of cartridges of a first type into the detection station such that when the cartridges of the first type are fully inserted into the detection station they protrude from the opening of the cartridge-receiving member a first distance;
a second stop provided along the insertion path that is adapted to limit insertion of cartridges of a second type into the detection station such that when the cartridges of the second type are fully inserted into the detection station they protrude from the opening of the cartridge-receiving member a second distance different from the first distance;
wherein the cartridge type is determined by the distance to which a fully-inserted cartridge protrudes from the detection station.

15. The detection station of claim 14, wherein the cartridge-receiving member includes rails that guide the cartridge along the insertion path.

16. The detection station of claim 14, wherein the first distance is greater than the second distance.

17. The detection station of claim 16, wherein the second stop is adapted to travel along a slot provided in cartridges that are inserted into the detection station and contact an end surface of the slots of cartridges of the second type to limit insertion of those cartridges.

18. The detection station of claim 17, wherein the first stop is an ultra density optical (UDO) stop that is adapted to limit insertion of UDO cartridges, and the second stop is a magneto-optical (MO) stop that is adapted to limit insertion of MO cartridges.

19. The detection station of claim 18, wherein the MO stop causes MO cartridges that are fully inserted into the cartridge type detection station to protrude farther from the detection station than the UDO stop causes UDO cartridges that are fully inserted into the detection station to protrude.

20. The detection station of claim 14, wherein the cartridge-receiving member is at least partially enclosed by the outer housing.

21. A media library, comprising:
a plurality of storage slots in which media cartridges are stored when not in use;
a first media drive that is adapted to write to and read from a first type of media cartridge;
a second media drive that is adapted to write to and read from a second type of media cartridge;
a picker mechanism that is adapted to transport cartridges within the library;
a dedicated cartridge type detection station separate from the storage slots and the media drives and exclusively used in the library to determine media cartridge type, the detection station being adapted to receive cartridges of the first and second types along an insertion path defined by the detection station; and
apparatus that determines the extent to which cartridges protrude from the detection station when the cartridges are fully inserted therein, the extent of protrusion being used to identify cartridge type.

22. The library of claim 21, wherein the dedicated cartridge type detection station includes a first stop that is configured to limit insertion of cartridges of the first type and a second stop that is configured to limit insertion of cartridges of the second type.

23. The library of claim 22, wherein the first stop is spaced a first distance from an opening of the detection station through which cartridges are inserted and the second stop is spaced a second distance from the opening, wherein the first distance is different from the second distance.

24. The library of claim 23, wherein the first stop is adapted to contact an insertion end of cartridges of the first type and the second stop is adapted to contact an end surface of a slot of cartridges of the second type.

25. The library of claim 24, wherein the first type of cartridge is an ultra density optical (UDO) cartridge and the second type of cartridge is a magneto-optical (MO) cartridge.

26. The library of claim 21, wherein the apparatus that determines the extent of protrusion comprises an encoder of the picker mechanism, wherein the encoder determines the linear position of a picker of the picker mechanism when the picker contacts a cartridge that is inserted into the dedicated cartridge type detection station.

27. A method for identifying a cartridge, the method comprising:
- inserting the cartridge into a cartridge type detection station;
- limiting the extent to which the cartridge can be inserted into the detection station relative to the cartridge type such that cartridges of a first type protrude from the detection station a different amount that cartridges of a second type when the cartridges are fully inserted into the detection station;
- measuring the distance that the cartridge protrudes from the detection station; and
- correlating the measured distance with a cartridge type.

28. The method of claim 27, wherein the method is performed to distinguish between magneto-optical (MO) cartridges and ultra density optical (UDO) cartridges.

* * * * *